US009704305B2

(12) United States Patent
Bromham et al.

(10) Patent No.: US 9,704,305 B2
(45) Date of Patent: Jul. 11, 2017

(54) METHOD OF PREDICTING THE FUTURE OPERATION OF A VEHICLE

(71) Applicant: Ford Global Technologies, LLC, Dearborn, MI (US)

(72) Inventors: Jim Bromham, Trowbridge (GB); James Wright, London (GB); Kim Ford, Basildon (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/930,249

(22) Filed: Nov. 2, 2015

(65) Prior Publication Data
US 2016/0125673 A1    May 5, 2016

(30) Foreign Application Priority Data
Nov. 5, 2014  (GB) .................................. 1419683.6

(51) Int. Cl.
*G07C 5/08*    (2006.01)
*G01C 21/26*    (2006.01)

(52) U.S. Cl.
CPC ............... *G07C 5/08* (2013.01); *G01C 21/26* (2013.01)

(58) Field of Classification Search
CPC  G07C 5/08; G01C 21/26; F01N 3/023; F01N 3/0231; F01N 3/0237; F01N 3/0238; F01N 9/002; F01N 2260/04; F01N 2430/00; F01N 2430/02; F01N 2430/04; F01N 2430/06; F01N 2430/08; F01N 2430/085; F01N 2430/10
USPC .................. 60/275, 286, 295, 297, 301, 303
See application file for complete search history.

(56) References Cited

U.S. PATENT DOCUMENTS

| 4,438,497 | A | | 3/1984 | Willis et al. |
| 5,734,971 | A | * | 3/1998 | Thayer ..................... H03G 3/00 348/731 |
| 7,360,615 | B2 | | 4/2008 | Salman et al. |
| 7,685,813 | B2 | | 3/2010 | McCarthy, Jr. |
| 8,281,572 | B2 | | 10/2012 | Chi et al. |
| 2010/0305798 | A1 | | 12/2010 | Phillips et al. |
| 2013/0024055 | A1 | | 1/2013 | Hysko, Jr. et al. |

(Continued)

FOREIGN PATENT DOCUMENTS

| GB | 2499712 A | 8/2013 |
| JP | 2004108777 A | 4/2004 |
| JP | 201208753 A | 6/2012 |

OTHER PUBLICATIONS

Bromham, Jim et al., "Method of Pre-Emptively Regenerating a Lean Nox Trap," U.S. Appl. No. 14/927,203, filed Oct. 29, 2015, 33 pages.

(Continued)

*Primary Examiner* — Hung Q Nguyen
*Assistant Examiner* — Xiao Mo
(74) *Attorney, Agent, or Firm* — Julia Voutyras; McCoy Russell LLP

(57) ABSTRACT

A method for predicting the future operation of a vehicle is disclosed which uses stored data representative of commonly followed routes to predict the future operation of the vehicle for the current trip. By establishing that the route currently being followed is comparable to one of the commonly followed routes, information relating to that "common route" is then used to predict the future operation of the vehicle for the current trip.

20 Claims, 4 Drawing Sheets

(56) References Cited

U.S. PATENT DOCUMENTS

2014/0081563 A1   3/2014  Wang et al.
2014/0257608 A1*  9/2014  Dufford ................ B60W 20/40
                                                        701/22

OTHER PUBLICATIONS

Intellectual Property Office, Combined Search and Examination Report of GB1419683.6, Apr. 23, 2015, Great Britain, 12 pages.
Examination Report of Great Britain Patent Application No. 1419683.6, May 19, 2015, 4 pages, Great Britain Intellectual Property Office.
Examination Report of Great Britain Patent Application No. 1419683.6, Aug. 12, 2015, 3 pages, Great Britain Intellectual Property Office.

* cited by examiner

METHOD OF PREDICTING THE FUTURE OPERATION OF A VEHICLE

CROSS REFERENCE TO RELATED APPLICATION

The present application claims priority to Great Britain Patent Application No. 1419683.6, filed Nov. 5, 2014, the entire contents of which are hereby incorporated by reference for all purposes.

FIELD

This invention relates to road vehicles and in particular to a method and apparatus for improving the operation of a road vehicle.

BACKGROUND AND SUMMARY

It is well known that various aspects of the operation of a road vehicle can be improved if the future operation of the vehicle is known. For example, in the case of a hybrid vehicle the efficient use and charging of an electric power supply can be improved if the future operation of the vehicle is known. In the case of a vehicle having a combustion engine, the regeneration or desulphurization of aftertreatment devices or the addition of reductants to an exhaust gas flow can be more efficiently carried out when the vehicle is being operated in a particular manner and by using knowledge of the future operation of the vehicle these activities can be scheduled to occur at an optimum period in time or when the engine of the vehicle is expected to be operating in a particular manner.

It has been proposed in, for example U.S. Pat. No. 7,685,813 to predict the future usage of a vehicle by using a navigation system. The navigation system such as a GPS system is used to predict the future route from which the expected usage of the vehicle while it is traversing that route can be derived.

There are a number of disadvantages associated with the use of a navigation system to predict the future usage or operation of a vehicle. Firstly, not all vehicles are fitted with such navigation equipment and so such a method could not be applied to such a vehicle. Secondly, if terrain mapping is required to predict the future operation of the vehicle then this is not currently available in all countries. Thirdly, if an entire route is to be predicted rather than the next few minutes of operation, then the final destination of the vehicle must be known if a navigation system is to be used. However, if the route to be followed is one that is well known to the driver, the driver will often not enter the destination in the navigation system and would consider it to be an unnecessary inconvenience if required to do so for every trip undertaken. If the final destination is not known by a navigation system, the system cannot predict the future operation of the vehicle for the entire trip only for a small part of the trip in the vicinity of where it is currently located.

It is an object of the invention to provide a method of predicting the future operation of a vehicle for the current drive cycle that does not require user intervention and is cost effective to implement.

According to a first aspect of the invention there is provided a method of predicting the future operation of a vehicle with an electronic processing system for storing non-transitory instructions, wherein the method comprises automatically carrying out the steps of: identifying a user of the vehicle; monitoring the operation of the vehicle for each trip conducted by the user; storing data collected from the monitoring for that user; establishing common patterns of operation from the stored data for that user; comparing a current pattern of operation with the stored common patterns of operation for that user, using, if the current pattern of operation conforms to a particular one of the stored common patterns of operation for that user, the particular one of the stored common patterns of operation for that user for predicting the future operation of the vehicle during the current trip; and using the predicted future operation of the vehicle during the current trip to improve at least one of charging of a battery of the vehicle, the supply of reductant to an exhaust aftertreatment device of the vehicle and the control of an engine of the vehicle for the purpose of regenerating an exhaust aftertreatment device of the vehicle.

Monitoring the operation of the vehicle for each trip conducted by the user may comprise monitoring a number of characteristic parameters against one of time and distance travelled for the duration of the trip.

The characteristic parameters may be characteristic vehicle parameters.

Alternatively, the characteristic parameters may be characteristic user parameters.

The characteristic parameters may be a combination of characteristic vehicle parameters and characteristic user parameters.

The characteristic vehicle parameters may comprise engine speed, vehicle speed and engine torque.

The characteristic user parameters may be selected from accelerator pedal position, rate of change of accelerator pedal position, brake pedal position, gear selector position, steering wheel rotational position, rate of change of steering wheel rotational position and clutch pedal position.

Establishing common patterns of operation may comprise comparing at least two characteristic parameters of operation against previously saved patterns of operation for the same parameters to determine whether there is concurrence between the various patterns and, if there is concurrence between several stored patterns of operation, storing the characteristics of the pattern of operation as a common pattern of operation.

The identity of a user may be established using at least one of a code stored in a key-fob, an indication of the position of a seat for the driver of the vehicle, an indication of the radio station selected by the driver, the position of an exterior mirror and the weight of the driver.

Comparing a current pattern of operation with the stored common patterns of operation may comprise comparing at least two characteristic parameters of operation against the stored common patterns of operation for the same parameters and, if there is concurrence between the current pattern of operation and one of the stored common patterns of operation, using the respective common pattern of operation to predict the future operation of the vehicle for the current trip.

According to a second aspect of the invention there is provided a vehicle having an electronic processing system to provide a prediction of the future operation of the vehicle for a current trip wherein the electronic processing system is operable to automatically: identify a user of the vehicle; monitor the operation of the vehicle for each trip conducted by the user; store data collected from the monitoring for that user in a memory; establish common patterns of operation from the stored data for that user; compare a current pattern of operation with the stored common patterns of operation for that user; use the particular one of the stored common patterns of operation to predict the future operation of the vehicle during the current trip if the current pattern of operation conforms to a particular one of the stored common patterns of operation for that user, and use the predicted future operation of the vehicle during the current trip to improve at least one of charging of a battery of the vehicle, the supply of reductant to an exhaust aftertreatment device of the vehicle and the control of an engine of the vehicle for the purpose of regenerating an exhaust aftertreatment device of the vehicle.

The electronic processing system may be operable to establish the identity of a user using at least one of a code stored in a key-fob, an indication of the position of a seat for the driver of the vehicle, an indication of the radio station selected by the driver, the position of an exterior mirror and the weight of the driver.

The invention will now be described by way of example with reference to the accompanying drawings.

DETAILED DESCRIPTION

Figure 1:
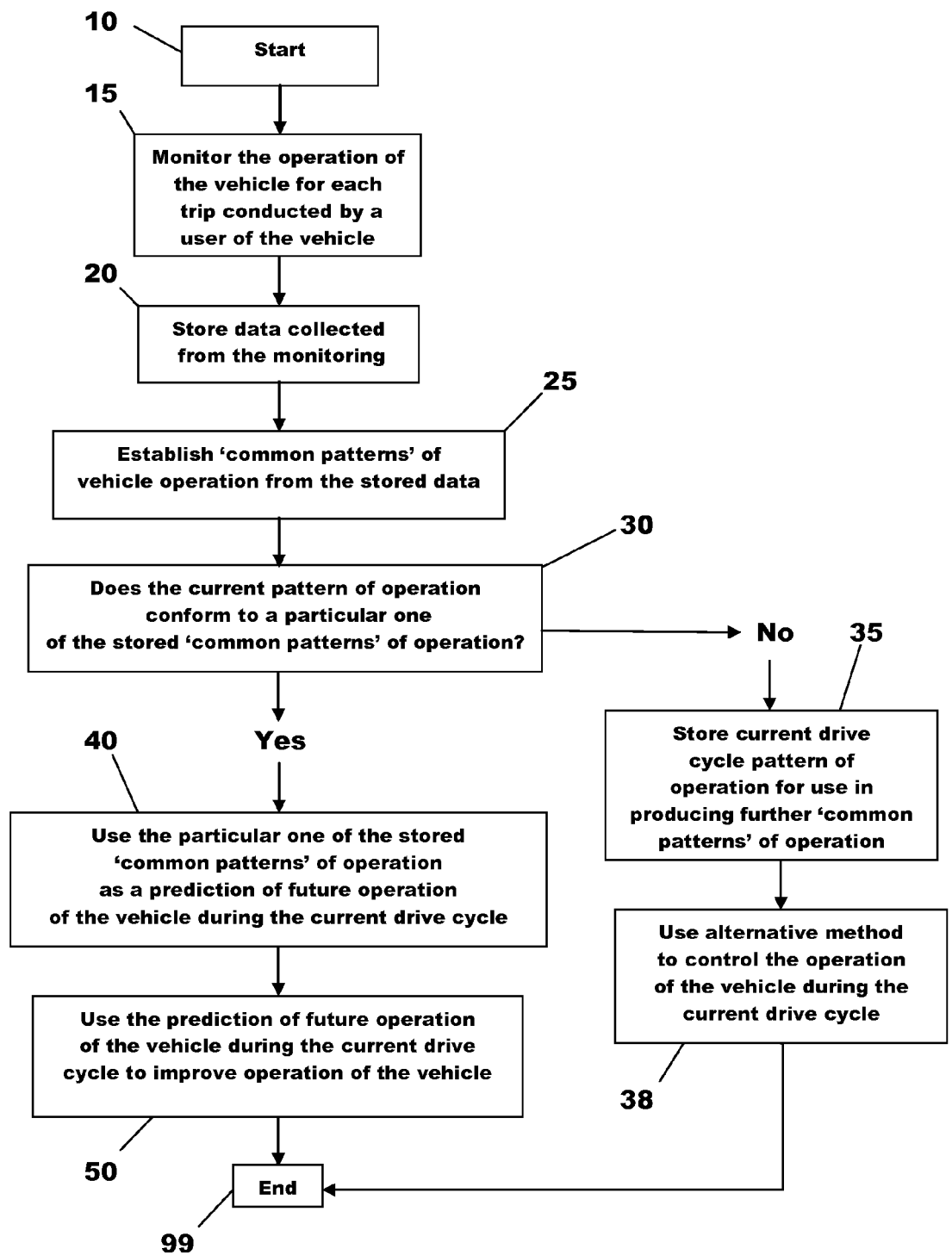
FIG. 1 is a high level flow chart of a method of predicting the future usage of a vehicle in accordance with a first aspect of the invention.
Figure 3:
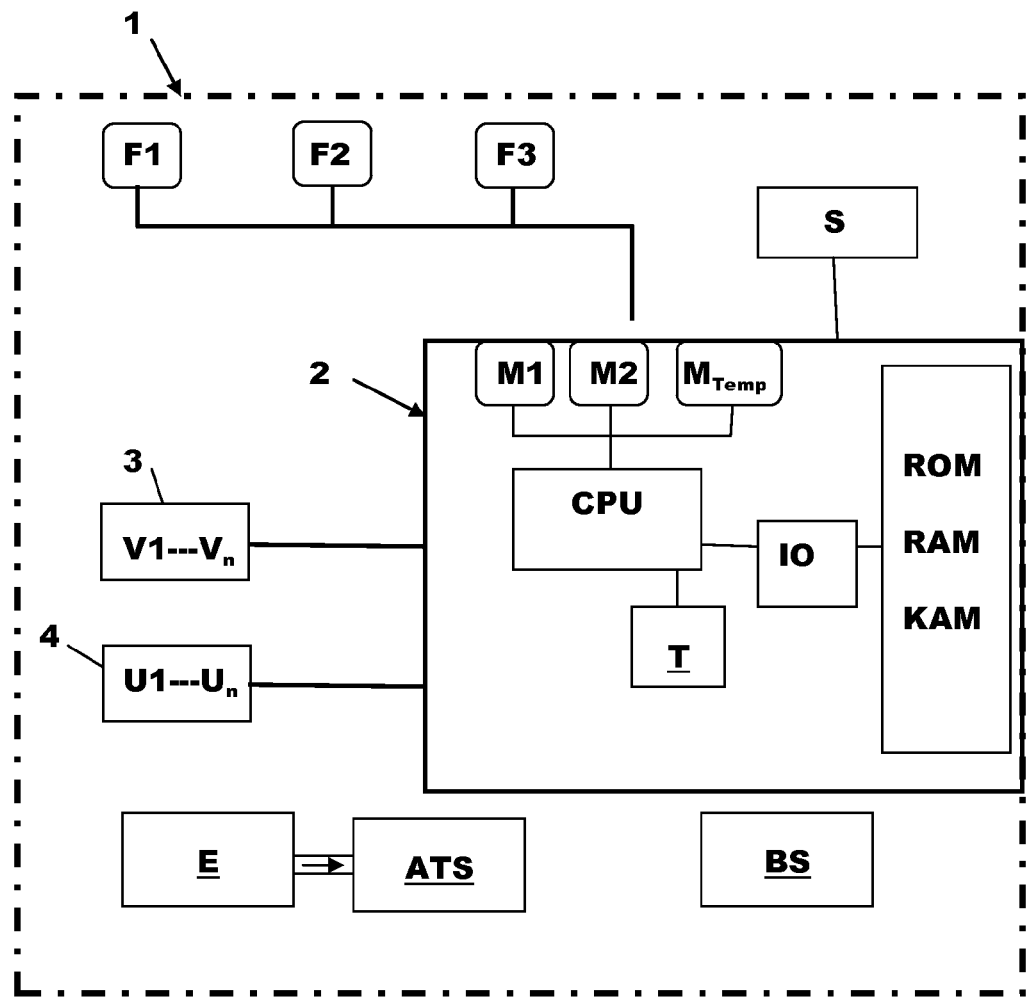
FIG. 3 is a block diagram of a vehicle having a system to predict the future operation of the vehicle in accordance with a second aspect of the invention.

With particular reference to FIG. 1 there is shown a method for predicting the future operation of a vehicle such as the vehicle 1 shown in FIG. 3.

The method starts in box 10 and then advances to box 15 where the operation of the vehicle is monitored for each trip conducted by a user of the vehicle. The various parameters monitored are those useful for both recognizing that a particular route is being followed and for use in determining when optimization of the operation of the vehicle can be made a later point in the current trip.

A trip as meant herein is a single drive cycle. A drive cycle can comprise a period starting with a key-on event and ending with a key-off event or starting when the vehicle moves in a forward direction following a key-on event and ending when the vehicle halts followed by a key-off event.

The parameters monitored can be divided into:
a. vehicle parameters such as, for example and without limitation, engine speed, vehicle speed, engine torque, gear ratio; and
b. user input parameters such as, for example and without limitation, accelerator pedal position, accelerator pedal rate of change, brake pedal position, gear selector position, steering wheel rotational position, and steering wheel position rate of change.

These parameters are referenced against either a timeline for a trip such as, the time that has elapsed since a key-on event occurred, the time that has elapsed since an initial movement of the vehicle is sensed to have occurred following a key-on event or against a measurement of distance travelled such as the distance travelled by the vehicle following a key-on event.

From box 15 the method advances to box 20 where the information collected from the monitoring is stored in a memory. It will be appreciated that the information is stored in real time and so the operations referred to in boxes 15 and 20 are running concurrently. It will be appreciated that the information collected by the monitoring could be stored as a continuous record of the parameter during the entire drive cycle or could be stored snap shots of the parameter stored when a predefined key event occurs. For example and without limitation, whenever a gear change occurs all of the parameters could be recorded for a predefined period of time following the gear change.

The method advances from box 20 to box 25 where 'common patterns' of vehicle operation are established. Most drivers have a number of routes that they use frequently follow and these routes are referred to herein as "common routes". For example and without limitation, the route from home to work, the route from work to home, the route from home to a supermarket, the route from home to the school of a child, the route from home to a sports venue such as a gym, swimming pool, golf club, football club and many other regularly followed routes.

When driving along such a common route the vehicle will operate in a similar manner every time it follows the route and characteristic vehicle behaviour will result that if recorded and recognized can be used to predict the future operation of the vehicle.

For example and without limitation, if on the route to work the vehicle has to negotiate a roundabout (rotary junction) after approximately two minutes from initial take-off from rest followed by acceleration onto a motorway then the resulting combination of the vehicle parameter and the user parameter are used to identify the route that the vehicle is currently following.

Therefore by analysing the stored data from previous trips a library of common routes can be built up. For example and without limitation, if characteristic operational features of a route occur more than a predefined number of times within a predefined period of time, the route can be classified as a common route. For example, if the previously referred to combination of vehicle and driver input parameters occurs five times over a four week period or for five times in 20 drive cycles, then that particular pattern of parameters is stored as a common route. Otherwise it is kept for future reference because it may become a common route when the next drive cycle occurs.

As an alternative when a route is driven at least once it is added to the library of common routes and the library of common routes are sorted based upon their frequency of use with routes not repeated in a predefined time period being deleted.

From box 25 the method advances to box 30 where the currently being driven route is compared to the common routes stored in the library and if one or more characteristic combinations of parameters that has occurred in the current drive cycle is found to be present in one of the common routes then it is assumed that the vehicle is following that particular common route and the method advances to box 40 where the stored common route is used to predict the future operation of the vehicle. For example, if after one minute from initial take-off following a key-on event or 0.5 Km from the origin of travel for the current trip it has been established that the vehicle is following a particular one of the stored common routes in box 30 then in box 40 a prediction of future vehicle operation for the remaining part of the route can be predicted.

This information can then be used to improve the operation of the vehicle for the rest of the current drive cycle or for a short predefined period of time following the current point in time depending upon the operation of the vehicle that is to be improved. For example, if the vehicle operation to be improved is battery charging, then it can be predicted that in "X" minutes time an engine over-run event will likely occur and so there is no need to use the engine to charge a battery of the vehicle now it can be charged during the over-run event thereby saving fuel. In the case of emission control apparatus it can be predicted that the following two minutes would be a good time to add reductant or regenerate an aftertreatment device.

It will be appreciated that, if the vehicle 1 deviates from the common route, the use of the future prediction provided in box 50 is not possible and so the regeneration will need to be controlled in some other manner. In such a case the method could jump from box 50 to box 38.

However, normally, the method advances from box 50 to box 99 where it ends when a key-off event occurs.

Referring back to box 30, if the current pattern of operation does not conform to one of the stored common routes then the method branches to box 35 where operational characteristics for the current route are stored. It will be appreciated that it is only through usage of the vehicle that the common routes can be defined and that when the vehicle is new no common routes will be present and when the vehicle is transferred to a new owner the common routes will no longer be valid. Therefore during the period where common routes are being defined and during all usage of the vehicle each route is stored and analysed to see if it can be defined as a common route.

From box 35 the method advances to box 38 where an alternative method for controlling the vehicle during the current drive cycle must be used because there is no available prediction of the future operation available although expected routes based upon standard data could be used. However, the vehicle has to be operated without the benefit of an actual prediction of future operation of the vehicle for the current trip.

As before, the method ends at box 99 when a key-off event occurs.

It will be appreciated that the parameters used to identify whether a vehicle is following a common route and hence the parameters used to define the characteristics of the common route need not be the same as the parameters of which knowledge is required in order to improve a particular function of the vehicle. For example, a comparison of steering wheel position verses time or distance travelled and gear ratio versus time or distance travelled could be used to establish correlation between a current route and one of the stored common routes but the information required in the future could be vehicle speed and accelerator pedal position which are also saved but are not used to establish whether the current route is a common route. For example and without limitation, by using steering wheel position and gear ratio it can be established that the vehicle is currently on a common route and locate where on the common route the vehicle is located. Using this information the vehicle speed and accelerator pedal position can be analysed for the predicted future operation of the vehicle for the current trip so as to locate a point in time or distance from the origin of travel where the vehicle is expected to decelerate for a significant period of time with the accelerator pedal not being applied for use in scheduling a recharging of a battery of the vehicle by converting the kinetic energy of the vehicle into electrical energy.

A method using stored common routes to predict future operation of a vehicle is referred to hereinafter as a common route predictor method (CRPM).

Figure 2A:
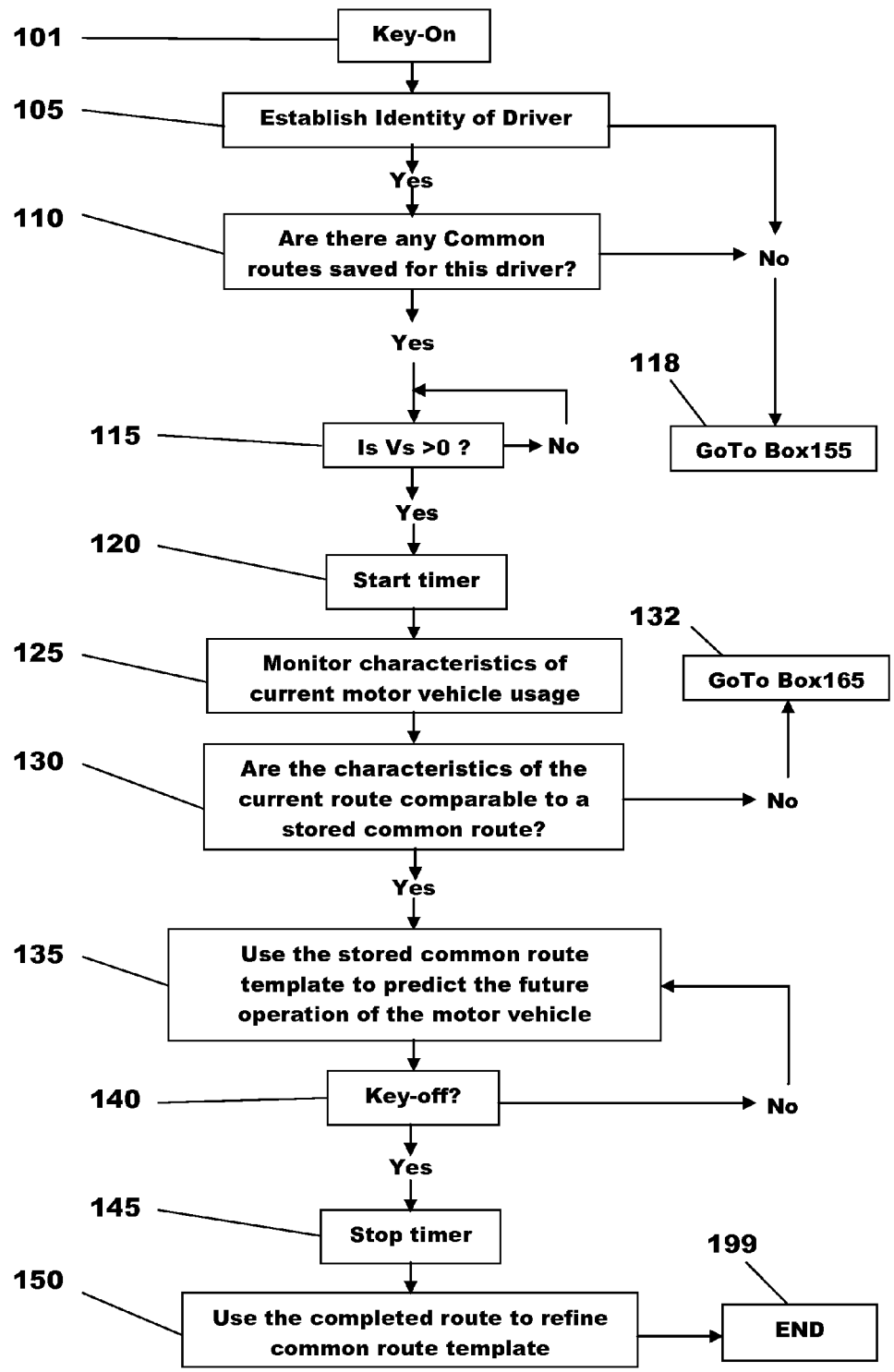
FIGS. 2A and 2B are a flow chart of one exemplary use of a method according to the first aspect of the invention applied to a vehicle having multiple known users.
Figure 2B:
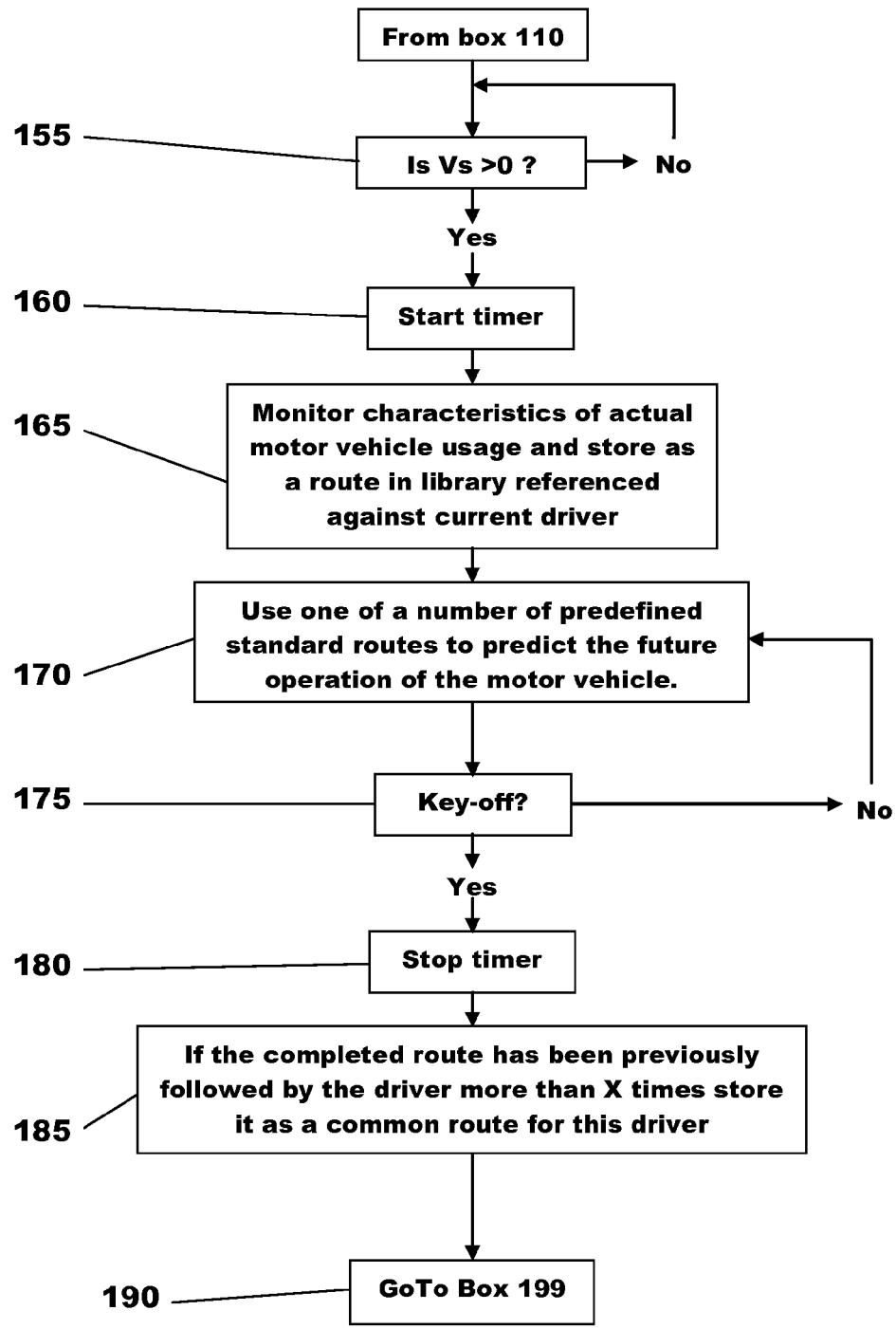

With reference to FIGS. 2A and 2B there is shown one specific embodiment of the use of a CRPM as applied to the vehicle 1 shown in FIG. 3.

The vehicle 1 includes an engine "E", an exhaust aftertreatment system "ATS" for the engine E, a battery system "BS" an electronic processing system (EPS) 2, a vehicle monitor 3 to provide information to the EPS 2 regarding a number of vehicle parameters (V1-Vn) such as, for example and without limitation, engine speed, vehicle speed, engine torque, gear ratio and a user monitor 4 to provide information to the EPS 2 regarding a number of user parameters (U1-Un) such as, for example and without limitation, accelerator pedal position, accelerator pedal rate of change, brake pedal position, gear selector position, steering rotational position and steering wheel rate of change.

EPS 2 is shown in FIG. 3 as a microcomputer. EPS 2 includes non-transitory memory or read only memory "ROM" for storing executable instructions. EPS 2 also includes volatile memory or random access memory "RAM" for storing variables and instructions. EPS also includes keep alive memory "KAM". EPS 2 includes a central processing unit "CPU" that is in electrical communication with RAM, ROM, KAM, and input and output ports "IO". EPS 2 may receive various signals from sensors "S" coupled to engine E.

The vehicle monitor 3 and the user monitor 4 use inputs from sensors that are often already present on a modern vehicle in order to efficiently operate the engine E of the vehicle 1, control exhaust emissions from the engine E of the vehicle 1 or automatically stop and start the engine E of the vehicle 1. For example and without limitation, in the case of the vehicle parameters these can be monitored using an engine speed sensor, a vehicle speed sensor, a sensor indicative of demanded torque, a mass airflow sensor, and other like sensors used to provide signals indicative of the dynamic state of the vehicle or operational parts of the vehicle such as the engine, the gearbox. In the case of the user parameters these can be monitored using an accelerator pedal sensor, a brake pedal sensor, a clutch pedal sensor, a gear selector sensor, a steering wheel rotational position sensor and other like sensors used to provide signals indicative of driver inputs.

It will be appreciated that the actual sensors used will be dependent upon the specific construction of the vehicle used and that it is not necessary for all of the above referred to sensors to be used. Furthermore in some embodiments further sensors not referred to above could alternatively or additionally be used.

The EPS 2 includes a number of memories "M1", "M2", "MTemp" a central processing unit "CPU" and a timer "T". It will be appreciated that the EPS 2 is shown schematically and is not intended to represent an actual electronic processing system.

Memory M1 is used to store the patterns of vehicle of operation for common routes associated with a first driver and memory M2 is used to store the patterns of vehicle of operation for common routes associated with a second driver.

The memory MTemp is used to store information during a current drive cycle and also patterns of operation from previous drive cycles that have not been classified so far as a common route. The memory MTemp is periodically emptied or purged of store information. For example and without limitation, if a route has not been repeated within a predefined period of time or a predefined number of drive cycles then it is assumed that it is unlikely to become a common route and so does not need to be retained and so is deleted.

The EPS 2 is arranged to improve the operation of one or more operational features of the vehicle 1 and, although three features F1, F2 and F3 are shown, it will be appreciated that more or less features could have their operation improved and that the invention is not limited to the function described which are provided only by way of example.

In the case of this example function F1 is the charging of a battery forming part of the battery system BS, F2 is the supply of reductant to an exhaust aftertreatment device forming part of the exhaust aftertreatment system ATS and F3 is the control of the engine E so as to enable regeneration of an exhaust aftertreatment device forming part of the exhaust aftertreatment system ATS. All of these functions have in common that it is advantageous to know what the future usage of the vehicle 1 will be in the current drive cycle so as to enable them to be carried out or performed more efficiently or with less negative environmental effect.

Referring back now to FIG. 2A, the method starts at box 101 with a key-on event and then advances to the box 105. In this case the identity of the user of the vehicle 1 is established by means of a code carried in a key fob (not shown) used to unlock the vehicle 1 and so the identity of the user of the vehicle 1 is immediately known upon unlocking of the vehicle 1. However, this need not be the case and the identity of the user could be established based upon the manner in which variations operations are carried out by the user or how features of the vehicle are set for usage by the user. For example and without limitation, the position of the driver's seat, the weight of the driver, the positioning of one or more mirrors, the selection of a particular radio station, the manner of acceleration or deceleration of the vehicle such as aggressive or gradual could all be used to assist with establishing whether the current driver is a known user of the vehicle 1.

Establishing the identity of a user of the vehicle 1 is useful because different users are likely to use different common routes and also because two drivers driving the same route are likely to produce different vehicle operating characteristics and so it is easier to produce a correlation between a currently being driven route and stored common route if the identity of the driver is known. It will be appreciated that if the actual usage of the vehicle is used to identify the user then the positioning of box 105 would need to be later in the sequence of events because the vehicle 1 may need to be moving to establish the identity of the user.

Referring back to box 105 if the identity of the user cannot be established the method branches to box 118 and from there to box 155, the description of which is dealt with later, but, if the identity of the user is established in box 105, then the method advances to box 110 where it is checked whether any common routes exist for the current user. If common routes do exist in the respective memory M1, M2 then the method advances to box 115 but if they do not exist then the method branches to box 118 and from there to box 155, the description of which is dealt with later.

In box 115 it is checked whether the vehicle 1 is moving in a forward direction, if it is not then the method loops back to recheck the speed of the vehicle 1 in box 115 again and if the vehicle 1 is moving in a forward direction the method advances from box 115 to box 120 where a timer such as the timer T is started. The starting of the timer T constitutes the beginning of a drive cycle that will continue until the timer T is stopped in box 145. In other embodiments the start and end points of a drive cycle are based upon key-on and key-off events respectively and the distance the vehicle has moved since the key-on event is used a reference scale.

From box 120 the method advances to box 125 where characteristic parameters of the vehicle 1 during use are monitored. In fact the monitoring of the various characteristic parameters required to build a common route or determine whether the vehicle 1 is driving on a common route will commence as soon as the timer T is started.

From box 125 with the various parameters now being monitored and stored in the temporary memory MTemp the method advances to box 130 to determine whether the route currently being driven conforms to one of the stored common routes for the current user. In this step various characteristic parameters are compared to the same parameters stored as part of the common route for the same elapsed time or for the same distance travelled. For example, a comparison of vehicle parameters such as engine speed, vehicle speed and engine output torque or engine torque demand versus time could be compared to see if the same patterns exist in the current route to one of the stored common routes for the current user.

It will be appreciated that tolerance bands could be applied to these parameters to allow for small differences between the current values and those retained as characteristic of the common route.

Alternatively or in addition to the use of vehicle parameters, user parameters could be compared. For example values of steering angle and accelerator pedal position could be compared versus time or gear selector position and clutch or brake pedal position against time could be compared.

By using a combination of both vehicle parameters and user parameters the probability that the result of a positive comparison is correct is increased.

If the result of the comparison in box 130 indicates that none of the currently stored common routes is comparable to the current route then the method branches to box 132 and from there to box 165, the description of which is dealt with later.

However, if a comparable common route is found in memory M1 or M2 depending on the current user of the vehicle 1, the method advances to box 135 where the stored common route is assumed to be an accurate prediction of the future operation of the vehicle 1 for the current drive cycle.

That is to say, values for various vehicle and user parameters can be predicted in the future based upon those values stored as part of the common route and these can be used in decision making processes used to optimize or improve the operation of the functions F1 to F3 that are in the case of this example influenced by the output from the EPS 2.

It will be appreciated that, if the vehicle 1 deviates from the common route, the future prediction provided in box 135 is not possible and so the regeneration will need to be controlled in some other manner. In such a case the method could jump or advance from box 135 to box 170.

However, normally, the method advances from box 135 to box 140 to check whether a key-off event has occurred and, if it has not, the method returns to box 135 so as to continue using the stored common route as a predictor for future events and this process will continue until the vehicle 1 has reached the final destination for the current drive cycle and a key-off event occurs. Therefore events occurring near to the end of a drive cycle whether they are vehicle parameter events or user parameter events can be predicted as soon as there is confirmation in box 130 that the current route is comparable to a specific one of the stored common routes.

When the end of the current drive cycle occurs as indicated by a key-off event the method will advance from box 140 to box 145 and the timer T is stopped. All of the data for the just completed route is then used to refine the common route template that is to say, any small variations in actual event occurrence compared to those predicted to occur is used to adjust the common route template by, for example varying the tolerances allowable for a positive comparison to be found or by adjusting the predicted values stored in the common route template based upon the newly created record.

The method then ends at box 199.

Referring back now to box 118, the method advances from the box 118 to the box 155 and this transfer will occur because either the identity of the driver cannot be established or there are no stored common routes for the current driver.

In box 155 it is checked whether the vehicle 1 is moving in a forward direction, if it is not then the method loops back to recheck the speed of the vehicle 1 in box 155 again and if the vehicle 1 is moving in a forward direction the method advances from box 155 to box 160 where a timer such as the timer T is started. The starting of the timer T constitutes the beginning of a drive cycle that will continue until the timer T is stopped in box 180.

From box 160 the method advances to box 165 where characteristic parameters of the vehicle during use are monitored and stored in, for example the temporary memory MTemp. In fact the monitoring of the various characteristic parameters required to build a common route commences as soon as the timer T is started. This step is used to begin to build the library of common routes for the current user if the user is known or for potential future use if a user not currently identified regularly uses the vehicle. The box 165 will also be entered from box 130 if the current route of the vehicle 1 is determined not be comparable to one of the stored common routes.

From box 165 the method advances to box 170 where, in this case, one of a number of stored standard routes is used to predict the short term future operation of the vehicle 1. The standard routes define the expected operation of the vehicle when it is operated in defined scenarios such as, for example, in city traffic, in urban traffic, on a motorway. By carrying out extensive research such standard routes can be produced which enable the short term prediction of future events to be used to assist with improving the operation of the functions F1 to F3 associated with the EPS 2. As an alternative to this approach standard control strategies can be used for the various functions F1 to F3 as would be the case if a prediction method is not available.

From box 170 the method advances to box 175 that is a check for the occurrence of a key-off event. If a key-off event has not occurred then the method returns to box 170.

Therefore, in the case where standard routes are used, a short term prediction of future vehicle operation can be provided so long as the current drive cycle continues as indicated by the arrow returning from box 175 back to box 170.

When a key-off event does occur the method advances from box 175 to box 180 where the timer T is stopped and then advances to box 185 where the just completed route is analysed to see if a comparable route has occurred more than a predefined number (X) of times before. If the same route has been followed more than X times then it is stored in one of the memories M1, M2 as a common route for the current driver if the identity of the driver is known or stored in the temporary memory MTemp for future comparison purposes.

After box 185 the method advances via box 190 to box 199 where it ends.

Therefore in summary the invention proposes using characteristic vehicle parameters and/or user parameters to produce a number of common routes that can be used to predict future operation of the vehicle once it has been confirmed that a route currently being followed is comparable to one of the common routes.

The method could further comprise remembering where the vehicle last stopped and using this to speed up the recognition of whether the vehicle is on a common route. Fr example if the vehicle last stopped at a supermarket the next route is likely to be from the supermarket to home and so this common route can be checked first.

Similarly, if the last route was from work to home then the next route is likely to be from home back to work and so this could be checked first.

One of the advantages of the invention is that the future operation of the vehicle can be predicted automatically without the intervention of the user of the vehicle. A further advantage of the invention is that the monitoring of the parameters both vehicle and user can be done using sensors that are often already present on the vehicle for other purposes and so the invention can be implemented in many cases with little additional cost. A further advantage is that the invention can be applied to vehicles having no navigation system or in countries where detailed digital road mapping has not taken place.

Yet one more advantage is that once it has been established that a vehicle is travelling on a common route the operation of the vehicle for the rest of the route can be predicted.

Although the invention does not require the use of a navigation system it will be appreciated that it could be used with benefit on a vehicle having such a system. It will also be appreciated that, in the case of a vehicle having a navigation system the navigation system could be used to provide a current geographic location for the vehicle thereby assisting with the comparison of the current route with the stored common routes.

The method is applicable to all types of road vehicle where there is a need to improve the operation of the vehicle based upon a prediction of the future operation of the vehicle for the current trip. Therefore the method can be used with benefit by full hybrid vehicles, micro-hybrid vehicles, conventional motor vehicles having an internal combustion engine and electric vehicles.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

The invention claimed is:

1. A method of predicting a future operation of a vehicle wherein the method comprises automatically carrying out the steps of:
 identifying a user of the vehicle;
 monitoring one or more operating parameters of the vehicle for each trip conducted by the user;
 storing data collected from the monitoring for the user;
 establishing and storing common patterns of operation from the stored data for the user;
 determining a current common pattern of operation based on the user of the vehicle, the one or more operating parameters, and the stored common patterns of operation;

using current common pattern of operation for predicting the future operation of the vehicle during a current trip; and using the predicted future operation of the vehicle during the current trip to improve at least one of charging of a battery of the vehicle, a supply of a reductant to an exhaust aftertreatment device of the vehicle, and a control of an engine of the vehicle for the purpose of regenerating the exhaust aftertreatment device of the vehicle;

wherein the method of predicting the future operation of the vehicle is carried out via an electronic processing system.

2. The method of claim 1, wherein the one or more operating parameters are monitored against one of time and distance travelled for a duration of the trip.

3. The method of claim 2, wherein the one or more operating parameters are characteristic vehicle parameters comprising engine speed, vehicle speed, and engine torque.

4. The method of claim 2, wherein the one or more operating parameters are characteristic user parameters selected from an accelerator pedal position, a rate of change of accelerator pedal position, a brake pedal position, a gear selector position, a steering wheel rotational position, a rate of change of steering wheel rotational position, and a clutch pedal position.

5. The method of claim 2, wherein establishing common patterns of operation comprises comparing at least two of the operating parameters against the stored common patterns of operation for the same parameters to determine whether there is concurrence between the various patterns of operation and, if there is concurrence between several stored patterns of operation, storing characteristics of the pattern of operation as a common pattern of operation.

6. The method of claim 1, wherein an identity of the user is established using at least one of a code stored in a key-fob, an indication of a position of a seat for the user of the vehicle, an indication of a radio station selected by the user of the vehicle, a position of an exterior mirror, and a weight of the user of the vehicle.

7. The method of claim 2, wherein the determining further comprises comparing at least two of the operating parameters against the stored common patterns of operation for the same parameters and, if there is concurrence between the current pattern of operation and one of the stored common patterns of operation, using the respective common pattern of operation to predict the future operation of the vehicle for the current trip.

8. A vehicle having an electronic processing system to provide a prediction of a future operation of a vehicle for a current trip wherein the electronic processing system is operable to automatically:

identify a user of the vehicle;
monitor one or more operating conditions of the vehicle for each trip conducted by the user;
store data collected from the monitoring for the user in a memory;
establish and store common patterns of operation from the stored data for the user;
determine a current common pattern of operation based on a comparison between a current pattern of operation with the stored common patterns of operation for the user, where the determining is not based on a navigation system;
use the current common pattern of operation to predict the future operation of the vehicle during the current trip if the current pattern of operation conforms to a particular one of the stored common patterns of operation for the user; and
use the predicted future operation of the vehicle during the current trip to improve at least one of charging of a battery of the vehicle, a supply of a reductant to an exhaust aftertreatment device of the vehicle, and a control of an engine of the vehicle for the purpose of regenerating the exhaust aftertreatment device of the vehicle.

9. The vehicle of claim 8, wherein the electronic processing system is operable to establish an identity of the user using at least one of a code stored in a key-fob, an indication of a position of a seat for the user of the vehicle, an indication of a radio station selected by the user, a position of an exterior mirror, and a weight of the user, and wherein the determining is further based on the identity of the user.

10. The method of claim 8, wherein establishing common patterns of operation comprises comparing at least two of the operating parameters against the stored common patterns of operation for the same parameters to determine whether there is concurrence between the various patterns of operation and, if there is concurrence between several stored patterns of operation, storing characteristics of the pattern of operation as a common pattern of operation.

11. The method of claim 8, wherein the comparison comprises comparing at least two of the operating parameters against the stored common patterns of operation for the same parameters and, if there is concurrence between the current pattern of operation and one of the stored common patterns of operation, using the respective common pattern of operation to predict the future operation of the vehicle for the current trip.

12. A method of predicting a future operation of a vehicle wherein the method comprises, via an electronic processing system, automatically carrying out the steps of:

identifying a user of the vehicle;
monitoring one or more operating parameters of the vehicle for each trip conducted by the user;
storing data collected from the monitoring for the user;
establishing and storing common patterns of operation from the stored data for the user;
determining a current common pattern of operation based on the user of the vehicle, the one or more operating parameters, and the stored common patterns of operation;
using current common pattern of operation for predicting the future operation of the vehicle during a current trip; and
using the predicted future operation of the vehicle during the current trip to improve of charging of a battery of the vehicle, a supply of a reductant to an exhaust aftertreatment device of the vehicle, and a control of an engine of the vehicle for the purpose of regenerating the exhaust aftertreatment device of the vehicle;
wherein the monitoring the one or more operating parameters of the vehicle for each trip conducted by the user comprises monitoring a number of characteristic parameters against one of time and distance travelled for a duration of the trip;
wherein the characteristic parameters are a combination of characteristic vehicle parameters and characteristic user parameters;
wherein the characteristic vehicle parameters comprise engine speed, vehicle speed, and engine torque.

13. The method of claim 12, wherein the one or more operating parameters comprise engine speed, vehicle speed, and engine torque, and wherein the determining is not based on a navigation system.

14. The method of claim 12, wherein the one or more operating parameters are selected from an accelerator pedal position, a rate of change of accelerator pedal position, a brake pedal position, a gear selector position, a steering wheel rotational position, a rate of change of steering wheel rotational position, and a clutch pedal position, and wherein the vehicle does not include a navigation system.

15. The method of claim 12, wherein the determining further comprises comparing at least two of the operating parameters against the stored common patterns of operation for the same parameters and, if there is concurrence between the current pattern of operation and one of the stored common patterns of operation, using the respective common pattern of operation to predict the future operation of the vehicle for the current trip.

16. The method of claim 14, wherein establishing common patterns of operation comprises comparing at least two of the operating parameters against the stored common patterns of operation for the same parameters to determine whether there is concurrence between the various patterns of operation and, if there is concurrence between several stored patterns of operation, storing the characteristics of the pattern of operation as a common pattern of operation.

17. The method of claim 1, wherein the determining is not based on a navigation system.

18. The method of claim 1, wherein the predicted future operation of the vehicle during the current trip is used to improve a supply of a reductant to an exhaust aftertreatment device of the vehicle or a control of an engine of the vehicle for the purpose of regenerating the exhaust aftertreatment device of the vehicle.

19. The method of claim 1, wherein the improving comprises adjusting a timing of the reductant supply to the exhaust aftertreatment device based on the one or more operating parameters.

20. The method of claim 12, where the improving comprises adjusting a timing of battery charging, adjusting a timing of regenerating the aftertreatment device, and adjusting a timing of supplying the reductant to the aftertreatment device.

* * * * *